US010506166B2

(12) United States Patent
Kuester et al.

(10) Patent No.: US 10,506,166 B2
(45) Date of Patent: Dec. 10, 2019

(54) FULL DISPLAY MIRROR ACTUATOR WITH LINKAGE ARM

(71) Applicant: Gentex Corporation, Zeeland, MI (US)

(72) Inventors: Ulrich A. Kuester, Spring Lake, MI (US); Danny L. Minikey, Jr., Fenwick, MI (US)

(73) Assignee: GENTEX CORPORATION, Zeeland, MI (US)

( * ) Notice: Subject to any disclaimer, the term of this patent is extended or adjusted under 35 U.S.C. 154(b) by 559 days.

(21) Appl. No.: 15/053,213

(22) Filed: Feb. 25, 2016

(65) Prior Publication Data
US 2016/0250970 A1 Sep. 1, 2016

Related U.S. Application Data

(60) Provisional application No. 62/121,915, filed on Feb. 27, 2015.

(51) Int. Cl.
*B60R 1/04* (2006.01)
*H04N 7/18* (2006.01)
(Continued)

(52) U.S. Cl.
CPC ........... *H04N 5/23293* (2013.01); *B60R 1/12* (2013.01); *B60R 2001/1253* (2013.01); *H04N 7/183* (2013.01)

(58) Field of Classification Search
None
See application file for complete search history.

(56) References Cited

U.S. PATENT DOCUMENTS

| 3,421,728 A * | 1/1969 | Gordon ..................... B60R 1/04 248/477 |
| 4,895,337 A * | 1/1990 | Oskam ..................... B60R 1/04 248/487 |

(Continued)

FOREIGN PATENT DOCUMENTS

EP 0202757 A2 4/1985

OTHER PUBLICATIONS

International Search Report and Written Opinion of the International Searching Authority, or the Declaration dated May 12, 2016 for International Application No. PCT/US2016/018956, filed on Feb. 22, 2016, 8 pages.

*Primary Examiner* — Anand S Rao
*Assistant Examiner* — Tyler B Edwards
(74) *Attorney, Agent, or Firm* — Price Heneveld LLP; Bradley D. Johnson

(57) ABSTRACT

A rearview mirror for a vehicle includes a housing defining an interior cavity and an open side. A substrate is rigidly coupled within the open side of the housing and has a reflective surface thereon. The rearview mirror further includes an actuation mechanism having a mounting plate rotatably coupled within the cavity of the housing at a first end of the mounting plate. A motor is rigidly coupled within the interior cavity of the housing adjacent a second end of the mounting plate. The motor has a first wheel coupled with an output shaft thereof, and the first wheel includes a pin coupled therewith that extends outwardly from the pin at a location offset from the output shaft of the motor. A first linkage arm is rotatably coupled between the pin of the first wheel and the second end of the mounting plate.

20 Claims, 3 Drawing Sheets

(51) Int. Cl.
*H04N 5/232* (2006.01)
*B60R 1/12* (2006.01)

(56) References Cited

U.S. PATENT DOCUMENTS

| | | |
|---|---|---|
| 5,969,870 A | 10/1999 | Jain et al. |
| 6,520,667 B1 | 2/2003 | Mousseau |
| 6,648,477 B2 | 11/2003 | Hutzel et al. |
| 7,722,199 B2 * | 5/2010 | DeWard .................. B60R 1/04 248/481 |
| 2005/0068647 A1 * | 3/2005 | Brandt .................. B60R 1/081 359/877 |
| 2008/0055757 A1 | 3/2008 | Uken et al. |
| 2011/0176323 A1 | 7/2011 | Skiver et al. |
| 2013/0279014 A1 | 10/2013 | Fish, Jr. et al. |
| 2014/0347488 A1 | 11/2014 | Tazaki et al. |

* cited by examiner

FULL DISPLAY MIRROR ACTUATOR WITH LINKAGE ARM

CROSS REFERENCE TO RELATED APPLICATION

This application claims priority under 35 U.S.C. § 119(e) to U.S. Provisional Patent Application No. 62/121,915, filed on Feb. 27, 2015, entitled "FULL DISPLAY MIRROR ACTUATOR WITH LINKAGE ARM," the disclosure of which is hereby incorporated herein by reference in its entirety.

TECHNOLOGICAL FIELD

The present disclosure relates generally to a full-display rearview mirror for a motor vehicle and more particularly, relates to a mechanism for automatic movement of the display mirror substrate between active and inactive positions.

SUMMARY

According to one aspect of the present disclosure, a rearview mirror for a vehicle includes a housing defining an interior cavity and an open side, a substrate coupled over the open side of the housing and having a reflective surface thereon, and an actuation mechanism operably coupled within the housing. The actuation mechanism includes a mounting plate rotatably coupled within the cavity of the housing at a first end of the mounting plate, a first wheel rotatably mounted within the interior cavity and including a pin extending therefrom a at a location offset from the output shaft of the motor, and a first linkage arm rotatably coupled between the pin of the first wheel and the second end of the mounting plate.

According to another aspect of the present disclosure, a rear-vision system for a vehicle includes a video camera mounted on the vehicle in a position to capture an image of a portion of an exterior thereof and a display mirror. The display mirror includes a housing defining an interior cavity and an open side, a substrate coupled over the open side of the housing and having a display in electronic communication with the camera for presenting the image thereon and a one-way reflective layer overlying the display, and an actuation mechanism operably coupled within the housing. The actuation mechanism has a mounting plate rotatably coupled within the cavity of the housing at a first end of the mounting plate, a first wheel rotatably mounted within the interior cavity and including a pin extending therefrom a at a location offset from the output shaft of the motor, and a first linkage arm rotatably coupled between the pin of the first wheel and the second end of the mounting plate.

According to another aspect of the present disclosure, a rearview mirror for a vehicle includes a housing defining an interior cavity and an open side, a substrate coupled over the open side of the housing and having a reflective surface thereon, and an actuation mechanism operably coupled within the housing. The actuation mechanism has a mounting plate rotatably coupled within the cavity of the housing at a first end of the mounting plate, a first linkage arm having a first end rotatably coupled with the second end of the mounting plate and a second end remote therefrom, and a second linkage arm having a first end rotatably coupled with the second end of the first linkage arm and a second end rotatably mounted within the interior cavity of the housing.

These and other features, advantages, and objects of the present device will be further understood and appreciated by those skilled in the art upon studying the following specification, claims, and appended drawings.

DETAILED DESCRIPTION OF EMBODIMENTS

Figure 1:
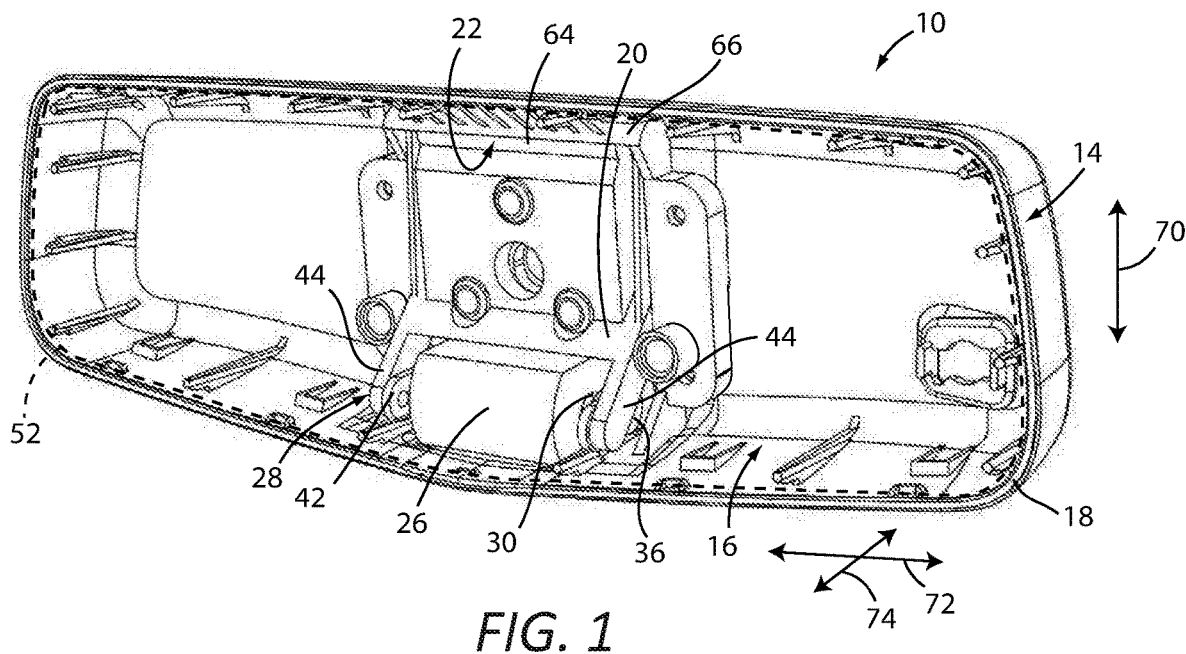
FIG. 1 is a front perspective view of a portion of a rearview mirror including an actuation mechanism for tilting a housing thereof.

For purposes of description herein the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
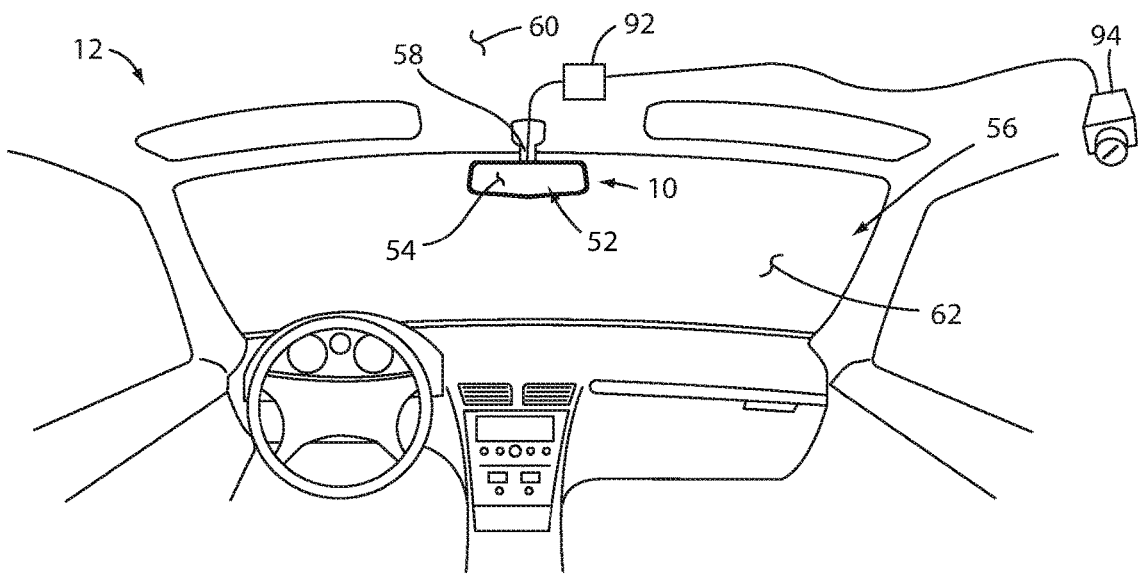
FIG. 2 is a perspective view of a portion of a vehicle interior including a rearview mirror including the portion of FIG. 1.

Referring now to FIG. 1, reference numeral 10 generally designates a rearview mirror for a vehicle 12 (of which the interior thereof is shown in FIG. 2). As shown in the partial view of FIG. 1, rearview mirror 10 includes a housing 14 defining an interior cavity 16 and an open side 18 to the cavity 16. An actuation mechanism 24 is coupled within interior cavity 16 of housing 14 and includes a mounting plate 20 having a first end 22 and a second end 28 opposite the first end 22 is rotatably coupled at the first end 22 thereof with housing 14 within cavity 16. A motor 26 is rigidly coupled within the interior cavity 16 of the housing 14 adjacent a second end 28 of the mounting plate 20. The motor 26 has a first wheel 30 coupled with an output shaft 32 thereof, and the first wheel 30 includes a pin 34 coupled therewith that extends outwardly from the first wheel 30 at a location offset from the output shaft 32 of the motor. A first linkage arm 36 is rotatably coupled between the pin 34 of the first wheel 30 and the second end 28 of the mounting plate 20.

As shown in the Figures, the operable, rotatable coupling of motor 26 with mounting plate 20 by the combination of linkage arm 36 and offset pin 34 of wheel 30 allows motor 26 to drive movement of mounting plate 20 relative to housing 14, with which motor 26 is rigidly coupled. As shown, mirror 10 can include a second wheel (not shown) affixed on an end of output shaft 32 that extends on a side of motor 26 opposite wheel 30. The second wheel can include a second offset pin (not shown) thereon that can be used for operable coupling of a second linkage arm 42 with mounting plate 20 on a side thereof opposite linkage arm 36. In such an arrangement, linkage arms 36 and 42 can couple with respective extension arms 44 that define second end 28 of mounting plate 20. Extension arms 44 can be spaced apart so as to receive motor 26 therebetween and to facilitate connection with linkage arms 36 and 42, given the location of motor 26 within housing 14 and the desired movement for mounting plate 20 with respect to housing 14, described further below.

As shown in FIG. 2, rearview mirror 10 can be used in connection with a vehicle interior 56. In one embodiment substrate 52 can include a video display along a portion or an entirety thereof such that rearview mirror is what may be referred to as a full-display mirror. A substrate 52 including such a display is referred to herein as "display substrate 52" and may be capable of displaying an image replicating that which would be available from a typical reflective mirror (which may be captured by an appropriately-positioned video camera, such as camera 94, or the like) when the display is in an active state. Such an image can be supplemented with other information presented on display substrate 52. In combination with such a display substrate 52, reflective surface 54 may be applied so as to overlie the display as a coating or separate element having properties to both provide a reflected image as well as to permit a video image of display substrate 52 to be visible therethrough in what may be referred to as a rear vision system.

The presence of reflective surface 54 permits substrate 52 to be used as a standard rearview mirror (i.e. without the need to view the displayed image) when the display is inactive, which may occur when the related vehicle 12 is not running or when power to the display substrate 52 is interrupted, for example. When in the active state, however, the presence of the reflective surface 54 over display substrate 52 can cause the image reflected by reflective surface 54 to compete with an image presented on display substrate 52. To alleviate such image competition, substrate 52 can be positioned such that reflective surface 54 reflects an image of the headliner 60 toward the driver. Because vehicle headliners are of generally consistent, non-reflective material, such an image may compete less with the video image of display substrate 52.

Rearview mirror 10, by way of the actuation mechanism 24, including mounting plate 20, wheels 30, and linkage arms 36 and 42, can provide for automatic repositioning of the remainder of mirror 10 (i.e., housing 14 and display substrate 52) between an appropriate position thereof for use of reflective surface 54 when display substrate 52 is in the inactive state and for viewing of a displayed image, without undesirable competition, when display substrate 52 is in the active state.

Figure 3:
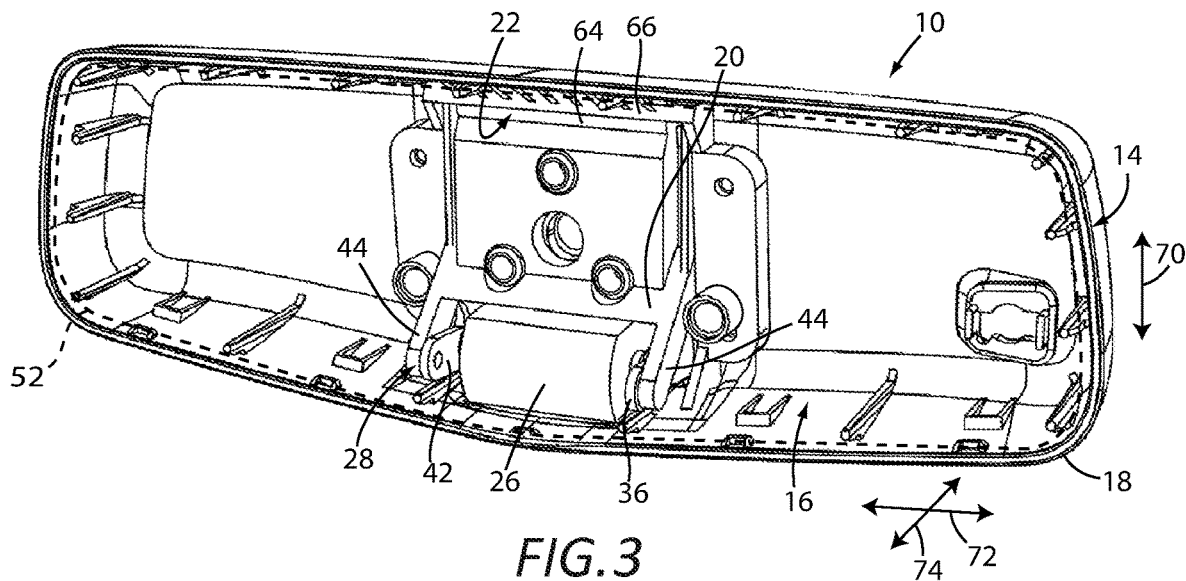
FIG. 3 is a front perspective view of the rearview mirror portion of FIG. 1 with the actuation mechanism in an additional configuration provided thereby.
Figure 4:
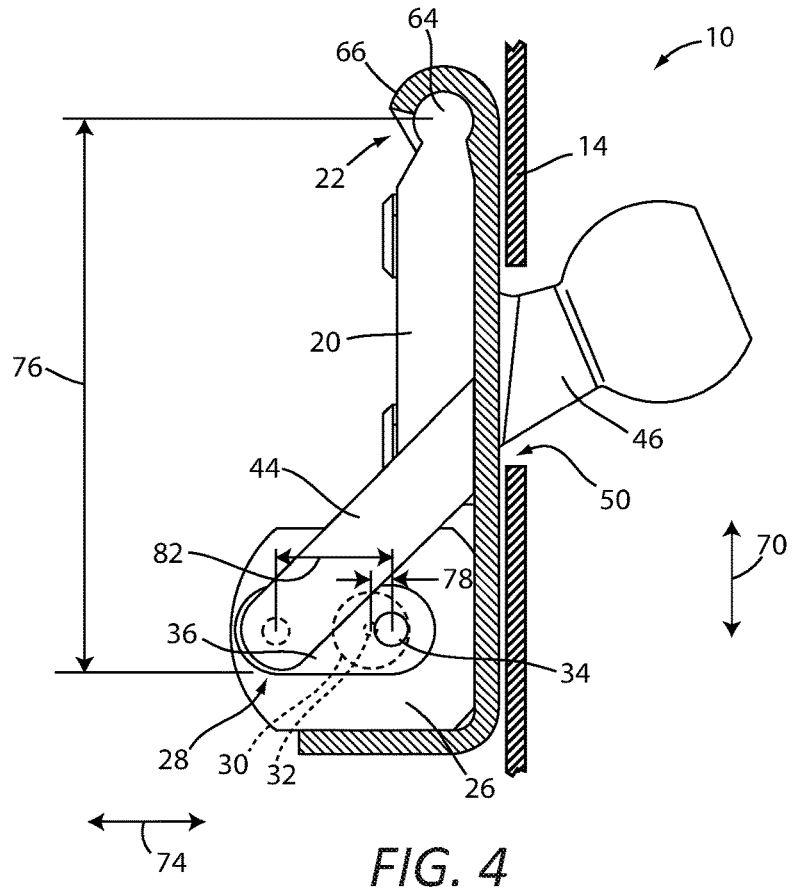
FIG. 4 is a side cross-sectional view of a further portion of the rearview mirror portion of FIG. 1 with the actuation mechanism in a configuration corresponding to an active position.

To facilitate such movement, the above-described internal components of rearview mirror 10, including mounting plate 20, wheels 30, and linkage arms 36 and 42 can move housing 14 by the above-described rotation of mounting plate 20 about first end 22 thereof. As shown in FIGS. 3 and 4, mounting plate 20 can couple with a mounting base 46 or other structure that can be a portion of or otherwise coupleable with the mounting structure 58 used to mount rearview mirror 10 within vehicle 12. Housing 14 may have an aperture 50 positioned adjacent mounting plate 20 such that mounting base 46 can pass therethrough, thus allowing mounting plate 20 to couple with mounting structure 58 to retain rearview mirror 10 in an adjustable position with respect to windshield 62 or headliner 60. Accordingly, the above-described relative movement of mounting plate 20 with respect to housing 14 causes movement of housing 14 (and accordingly substrate 52 coupled therewith) in the form of rotation thereof about first end 22 of mounting plate 20. Such movement, in turn moves substrate 52 between the above-described active (FIG. 1) and inactive (FIG. 3) positions, according to whether or not display substrate 52 is in an off-state or an on-state.

As shown in FIG. 3, when display substrate 52 is inactive, rearview mirror 10 can be configured with actuation mechanism 24 and mounting plate 20 in the corresponding inactive position such that display substrate 52 can be manually moved to an appropriate position for use of reflective surface 54. Such movement can be done by the driver of vehicle 12 by movement of housing 14 about mounting structure 58, in a manner similar to that which is used for conventional rearview mirrors. Upon activation of the display substrate 52, rearview mirror 10, as described further below, can cause housing 14 and display substrate 52 to tilt upward with respect to housing 14, thereby orienting reflective surface 54 toward headliner 60, as shown in FIG. 1. Such orientation can be achieved by rotation of mounting plate 20 with respect to housing 14 through an angle of about 6°, although such an angle can vary based on the location and structure of rearview mirror 10. Upon deactivation of display substrate 52, rearview mirror 10 can return display substrate 52 to the orientation shown in FIG. 3.

The movement of display substrate 52 by rearview mirror 10 can be achieved by rotation of wheel 30 by rotation of output shaft 32, driven by motor 26 to move mounting plate 20 with respect to motor 26 and housing 14. Rotation of wheel 30 can be implemented automatically upon a change in the state (from active to inactive or vice versa) of display substrate 52. In an example, wheel 30 can be automatically rotated to cause movement of housing 14 and display substrate 52 from the active state (shown in FIG. 1) to the inactive state (shown in FIG. 3) upon a detected malfunction of display substrate 52 or powering down of vehicle 12. By the use of wheel 30 to move mounting plate 20 to achieve such positioning of substrate 52, housing 14 can be left in the selected position for off-state usage of rearview mirror 10, meaning that upon deactivation of display substrate 52, resulting in a return of substrate 52 to the position shown in FIG. 3, rearview mirror 10 may be in a generally acceptable position for inactive state usage thereof.

As described above, movement of housing 14 and substrate 52 can be achieved by the above-described operative coupling of motor 26 with second end 28 of mounting plate 20 by wheel 30 and linkage arm 36 (and optionally linkage arm 42 and the associated second wheel), in which rotational movement of wheel 30 about output shaft 32 moves second end 28 of mounting plate 20 in a generally outward or inward direction with respect to housing 14, thereby causing rotation of housing 14 and substrate 52 about first end 22 of mounting plate 20 upward about mounting structure 56 with which mounting plate 20 is generally fixed.

Returning now to FIG. 1, housing 14 is shown in the form of a single-piece structure, which can be made to generally replicate the appearance of a standard rearview mirror, and can further be made from a single piece of injection molded plastic or the like, although other materials are possible. In an example, substrate 52 can be coupled directly housing 14 over open end 18. In an alternative example, substrate 52 can be coupled with a bezel or other secondary housing piece (not shown) that can, in turn, be coupled with housing 14. In either example, housing 14 is structured so that interior cavity 16 is of a sufficient depth to retain internal structures thereof, including motor 26, actuation mechanism 24, and other related structures, as well as control circuitry for display substrate 52. Housing 14 is also structured such that open side 18 is sufficiently large to accept substrate 52 therein in a manner that, again, can replicate the appearance of a typical rearview mirror.

Mounting plate 20, as described above, is rotatably coupled with housing 14 at first end 22 thereof. Such coupling can be achieved by the incorporation of a first hinge portion 64 into first end 22 of mounting plate 20 and a mating second hinge portion 66 into housing 14. Alternatively, a separate hinge (not shown) can be coupled between mounting plate 20 and housing 14. As further shown in FIG. 1, mounting plate 20 can generally extend through a majority of a vertical height of housing 14 and can, further, be of a width sufficient to stably support the entirety of mirror 10, such as by attachment of mounting base 46 to a side of mounting plate 20 opposite substrate 52 with a portion of mounting structure 58 passing through the appropriately-sized aperture 50 in housing 14.

Figure 5:
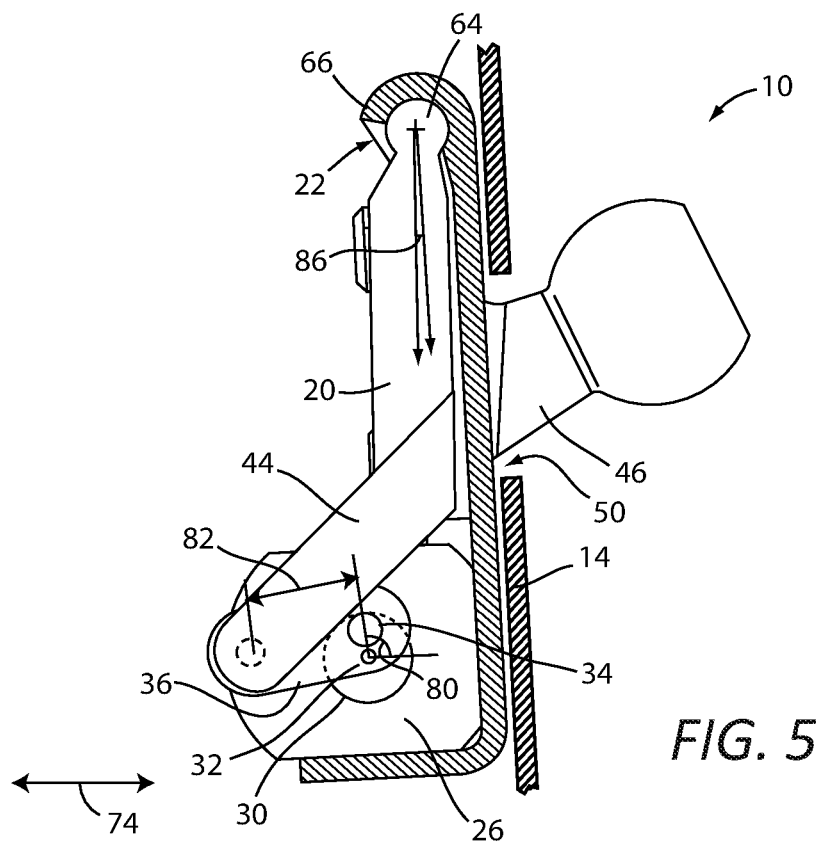
FIG. 5 is a side cross-sectional view of the rearview mirror portion of FIG. 4 with the actuation mechanism in a configuration corresponding to a general midpoint during movement between the active position and an inactive position.
Figure 6:
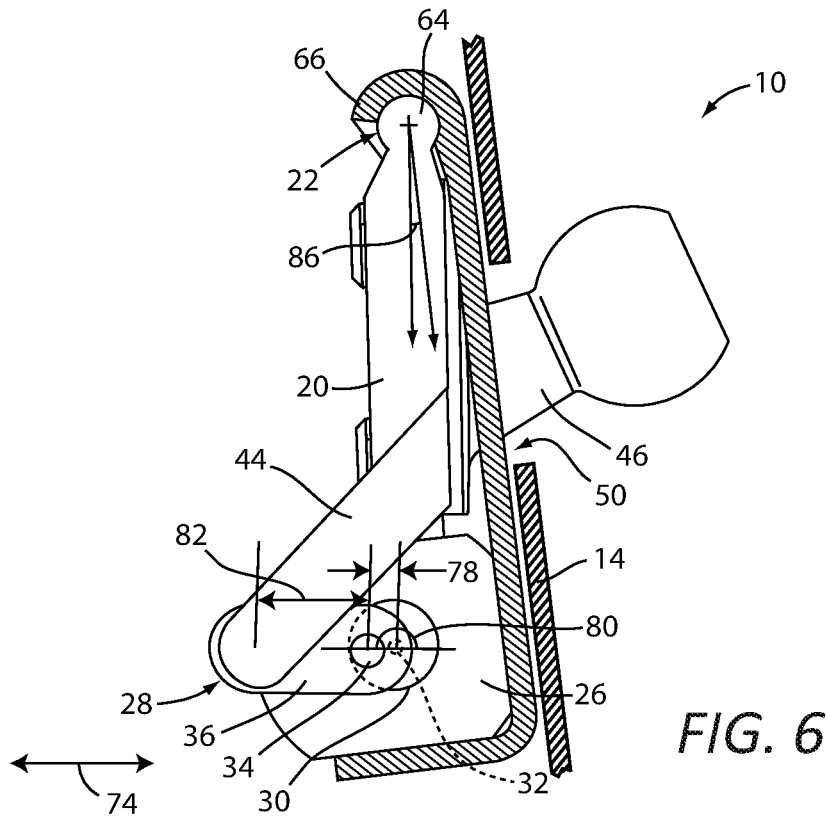
FIG. 6 is a side cross-sectional view of the rearview mirror portion of FIG. 4 with the actuation mechanism in a configuration corresponding to an inactive position.

Turning now to FIGS. 4-6, the movement of mounting plate 20 achieved by actuation mechanism 24 is illustrated in detail. In particular, the coupling of second end 28 of mounting plate 20 to one or more wheels 30 by respective linkage arms 36 and 42 allows for a component of the rotational movement of wheels 30 in the longitudinal horizontal direction 74 to apply a force on second end 28 of mounting plate 20 to cause rotation thereof about first end 22. The relative proportions of the height 76 of mounting plate 20 and the distance 78 by which pins 34 are offset from output shaft 32 dictate the amount of movement of mounting plate 20 relative to housing 14 achieved by rotation of output shaft 32. In particular, it may be desired to structure mounting plate 20 and wheels 30 such that, as discussed above, rotational movement of mounting plate 20 relative to housing 14 through an angle of between about 5° and about 10° (and in an embodiment about 6°) is achieved by rotation of wheels 30 through an angle 80 (FIG. 6) of about 180°. In such an arrangement, pins 34 can be positioned on the respective wheels 30 so as to be offset from output shaft 32 by a distance of between about 2 mm and about 3 mm, and in one embodiment about 2.6 mm and mounting plate 20 can have a corresponding height 76 of between about 45 mm and about 55 mm and in one embodiment about 48 mm. By this arrangement, the portion of wheels 30 between the motor output shaft 32 and pins 34 effectively forms its own linkage arm. In some embodiments, an arm structure can be substituted for wheels 30; however, in some applications, wheels 30 may provide improved balance and reduced vibration. In the illustrated embodiment, a length 82 of linkage arms 36 and 42 can be selected to accommodate the relative movements of the corresponding pins 34 and of mounting plate 20 given the desired positions of motor 26 and mounting plate 20. In an example, the length 82 of linkage arms 36 and 42 can be at least 3 times the offset distance 78 of pins 34 and in one embodiment, about 4 times offset distance 78 or about 10 mm.

As shown in FIG. 4, the active position of mirror 10 can correspond to a position of wheels 30 such that pins 34 are in the closest position thereof with respect to front wall 84 of housing 14. Such a position also corresponds, in the example shown, to a positioning of mounting plate 20 in a generally parallel relationship to front wall 84. As shown in FIG. 5, during movement of mirror 10 out of the active position and into the inactive position, motor 26 is used to implement rotation of wheels 30 about output shaft 32, thereby causing rotation of mounting plate 20 by the coupling of linkage arms 36 and 42 therebetween. As shown in FIG. 5, rotation of wheels 30 through an angle 80 of about 90° can correspond to rotation of mounting plate 20 through a corresponding angle 86 of, for example, about 3°. Although rotation 80 of wheels 30 is shown in FIG. 5 as being such that wheel 30 is rotated in a counter-clockwise direction (with respect to the view shown in FIG. 5), the same rotation of mounting plate 20 can be achieved with rotation thereof in an opposite direction.

Continued rotation of wheels 30 can cause continued rotation of mounting plate 20 with respect to housing 14 until rotation angle 80 reaches 180°, at which point, mounting plate 20 can be rotated through angle 84 of about 6°, for example to position mirror 10 in the inactive position, as shown in FIG. 6. At such an instance, rotation of wheels 30 can be stopped to maintain mirror 10 in the inactive position. Such rotation of wheels 30 can be implemented by controller 92, as illustrated in FIG. 2. Such a controller can be positioned within mirror 10 or elsewhere within vehicle 12. Additionally, or alternatively, controller 92 can be included in another control system of vehicle 12, such as that which is associated with the rear vision system described above. Further, the rotation of wheels 30 can be implemented based on a calculation of the rotation thereof based on the characteristics of the motor and the current applied thereto or can be controlled based on information received from one or more sensors within motor 26 or elsewhere within mirror 10. When movement of mirror 10 from the inactive state to the active state (FIG. 4) is desired, rotation of wheels 30 can be driven by motor 26 in the same direction used to move mirror 10 from the active state to the inactive state or by reversing the rotational direction of motor 26.

In an embodiment motor 26 can be a 12 volt DC motor that can be configured to directly drive the rotation of wheels 30 or can include a reduction mechanism, as needed. Further, motor 26 can be controlled to rotate wheels 30 through the above-described motion in a period of about 2 seconds or less. In an embodiment, a control circuitry for motor 26 can be configured to move mirror 10 to the inactive position, if necessary, upon a loss of power thereto, which can include an unexpected loss of power or upon the associated vehicle being turned off.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above is merely for illustrative purposes and not intended to limit the scope of the device, which is defined by the following claims as interpreted according to the principles of patent law, including the Doctrine of Equivalents.

What is claimed is:

1. A rearview mirror for a vehicle, comprising:
a housing defining an interior cavity and an open side;
a substrate rigidly fixed to the housing over the open side and having a reflective surface on the substrate; and
an actuation mechanism operably coupled within the housing and including:
a mounting plate defining a first end and a second end, the mounting plate being rotatably coupled within the interior cavity of the housing at the first end of the mounting plate with the housing and substrate being rotatable about the first end of the mounting plate;
a first wheel rotatably mounted at a rotation point within the interior cavity and including a pin fixedly extending from the wheel at a location on the wheel offset from the rotation point; and
a first linkage arm rotatably coupled at a first end thereof to the pin of the first wheel and at a second end of the first linkage arm to the second end of the mounting plate.

2. The rearview mirror of claim 1, further including a mounting structure coupled with the mounting plate:
wherein rotation of the first wheel drives rotation of the mounting plate with respect to the housing, thereby causing the housing to rotate with respect to the mounting structure.

3. The rearview mirror of claim 1, further including a motor having an output shaft having first and second ends and being rigidly coupled within the interior cavity of the housing adjacent the second end of the mounting plate, the motor having the wheel coupled with the first end of the output shaft thereof to rotatably mount the wheel within the interior cavity.

4. The rearview mirror of claim 3, further including:
a second wheel coupled with the output shaft on a second end thereof opposite the first end, the second wheel including a pin extending from the second wheel at a location on the wheel offset from the output shaft of the motor and generally coaxial with the pin of the first wheel; and
a second linkage arm rotatably coupled at a first end thereof to the pin of the second wheel and at a second end of the second linkage arm to the second end of the mounting plate on a side opposite the first linkage arm.

5. The rearview mirror of claim 3, further including a controller in electrical communication with the motor to cause the motor to drive a rotation of the output shaft.

6. The rearview mirror of claim 1, wherein the housing rotates about the first end of the mounting plate through a first predetermined angle upon rotation of the wheel through a second predetermined angle.

7. The rearview mirror of claim 6, wherein:
the mounting plate has a first length between the first end thereof and the second end thereof;
the linkage arm has a second length thereof defined between a point of coupling with the pin and a point of coupling with the mounting plate; and
the first length, the second length, and the offset are such that the first predetermined angle is between about 3 and 10 degrees when the second predetermined angle is about 180 degrees.

8. The rearview mirror of claim 6, wherein the first predetermined angle is about 6 degrees when the second predetermined angle is about 180 degrees.

9. The rearview mirror of claim 1, wherein the substrate includes a display screen, and wherein the reflective surface overlies the display screen.

10. A rear-vision system for a vehicle, comprising:
a video camera mounted on the vehicle in a position to capture an image of a portion of an exterior thereof; and
a display mirror, including:
a housing defining an interior cavity and an open side;
a substrate rigidly fixed to the housing over the open side and having a display in electronic communication with the camera for presenting the image thereon and a one-way reflective layer overlying the display; and
an actuation mechanism operably coupled within the housing and including:
a mounting plate defining a first end and a second end, the mounting plate being rotatably coupled within the interior cavity of the housing at the first end of the mounting plate with the housing and substrate being rotatable with respect to the mounting plate about the first end of the mounting plate;
a first wheel rotatably mounted at a rotation point within the interior cavity and including a pin fixedly extending from the wheel at a location on the wheel offset from the rotation point; and
a first linkage arm rotatably coupled at a first end thereof to the pin of the first wheel and at a second end of the first linkage arm to the second end of the mounting plate.

11. The system of claim 10, further comprising:
a motor mounted within the interior cavity of the housing, the first wheel being coupled with the motor at the rotation point for the motor; and
a controller coupled with the motor for controlling the motor to drive a rotation of the first wheel.

12. The system of claim 11, wherein:
the rotation of the first wheel rotates the housing about the first end of the mounting plate between a first position and a second position; and
the controller is further in electronic communication with the display and automatically causes the rotation of the first wheel to move the housing between first and second positions upon one of an activation or deactivation of the display, respectively.

13. The system of claim 12, wherein when in the first position, the substrate is angled toward a headliner of the vehicle by between 5 degrees and 10 degrees relative to the second position.

14. A rearview mirror for a vehicle, comprising:
a housing defining an interior cavity and an open side;
a substrate rigidly fixed to the housing over the open side and having a reflective surface on the substrate; and
an actuation mechanism operably coupled within the housing and including:
a mounting plate defining a first end and a second end, the mounting plate being rotatably coupled within the interior cavity of the housing at the first end of the mounting plate with the housing and substrate being rotatable in a first plane with respect to the mounting plate about the first end of the mounting plate;
a first linkage arm having a first end coupled with the second end of the mounting plate and a second end remote therefrom, the first linkage arm being rotatable with respect to the second end of the mounting plate parallel with the first plane; and a second linkage arm having a first end coupled with the second end of the first linkage arm and a second end rotatably mounted within the interior cavity of the housing, the second linkage arm being rotatable with respect to the second end of the first linkage arm parallel with the first plane.

15. The rearview mirror of claim 14, wherein the second linkage arm is defined on a wheel rotatably mounted within the interior cavity at a center thereof defining the second end of the second linkage arm, a pin extending from the wheel at a location offset from the center and defining the first end of the second linkage arm, the first linkage arm rotatably coupling with the pin.

16. The rearview mirror of claim 14, further including a motor having an output shaft and rigidly coupled within the interior cavity of the housing adjacent the second end of the mounting plate, the second linkage arm being coupled with a first end of the output shaft thereof to rotatably mount the second linkage arm within the interior cavity.

17. The rearview mirror of claim 16, further including:
a third linkage arm having a first end rotatably coupled with the second end of the mounting plate opposite the first linkage arm, the third linkage arm extending to a second end remote from the first end; and
a fourth linkage arm including a first end rotatably coupled with the second end of the third linkage arm and further including a second end coupled with the interior cavity of the housing on a second end thereof opposite the first end of the fourth linkage arm, the second and fourth linkage arms being constrained to rotate together.

18. The rearview mirror of claim 16, further including a controller in electrical communication with the motor to cause the motor to drive a rotation of the output shaft.

19. The rearview mirror of claim 14, wherein the housing rotates relative to the mounting plate through a first predetermined angle of about 6 degrees upon rotation of the second linkage arm through a second predetermined angle of about 180 degrees.

20. The rearview mirror of claim 14, wherein the substrate includes a display screen, and wherein the reflective surface overlies the display screen.

* * * * *